(12) United States Patent
Birke et al.

(10) Patent No.: US 9,105,882 B2
(45) Date of Patent: Aug. 11, 2015

(54) ENERGY STORAGE CELL

(75) Inventors: Peter Birke, Glienicke/Nordbahn (DE); Michael Schiemann, Berlin (DE); Olaf Böse, Berlin (DE); Hans-Georg Schweiger, Ingolstadt (DE); Michael Keller, Berlin (DE)

(73) Assignee: Continental Automotive GmbH, Hannover (DE)

( * ) Notice: Subject to any disclaimer, the term of this patent is extended or adjusted under 35 U.S.C. 154(b) by 0 days.

(21) Appl. No.: 13/643,557

(22) PCT Filed: Apr. 13, 2011

(86) PCT No.: PCT/EP2011/055776
§ 371 (c)(1),
(2), (4) Date: Jan. 7, 2013

(87) PCT Pub. No.: WO2011/134792
PCT Pub. Date: Nov. 3, 2011

(65) Prior Publication Data
US 2013/0095368 A1    Apr. 18, 2013

(30) Foreign Application Priority Data

Apr. 26, 2010    (DE) .......................... 10 2010 018 289

(51) Int. Cl.
*H01M 2/02*    (2006.01)
*H01M 10/04*    (2006.01)
(Continued)

(52) U.S. Cl.
CPC ............. *H01M 2/0237* (2013.01); *H01G 9/058* (2013.01); *H01G 11/74* (2013.01); *H01G 11/82* (2013.01); *H01M 2/021* (2013.01); *H01M 2/024* (2013.01); *H01M 2/0212* (2013.01); *H01M 10/04* (2013.01); *H01M 10/5004* (2013.01); *H01M 10/5016* (2013.01); *H01M 10/5032* (2013.01); *H01M 10/5036* (2013.01); *H01M 10/058* (2013.01); *H01M 10/0525* (2013.01); *Y02T 10/7011* (2013.01)

(58) Field of Classification Search
None
See application file for complete search history.

(56) References Cited

U.S. PATENT DOCUMENTS

| 7,276,313 B2 | 10/2007 | Watanabe et al. | |
| 2003/0224246 A1* | 12/2003 | Watanabe et al. | ............. 429/159 |

(Continued)

FOREIGN PATENT DOCUMENTS

| CN | 101312240 A | 11/2008 |
| EP | 1376718 A2 | 1/2004 |

(Continued)

*Primary Examiner* — Patrick Ryan
*Assistant Examiner* — Haixia Zhang
(74) *Attorney, Agent, or Firm* — Laurence A. Greenberg; Werner H. Stemer; Ralph E. Locher

(57) ABSTRACT

An energy storage cell has a cell body with an areal expansion in an extension plane, with four side faces bounding a circumference of the area of extent and having each two of the side faces parallel to one another. A conductor electrode and a second electrode are disposed on one of the side faces symmetrically in the direction of the circumference of the extension plane relative to a center of the corresponding side face. A line from a contact point between an inward facing edge of the electrodes to a center point of the extension plane encloses an angle $\lambda$ of $10°<\lambda<36°$ with the corresponding side face. The center of the side face and/or a contact point of an outward facing edge of the electrodes forms an angle $\beta$ about the center point of the extension plane of $8°<\beta<45°$ with the corresponding side face with said center.

13 Claims, 2 Drawing Sheets

(51) Int. Cl.
  *H01M 10/613* (2014.01)
  *H01M 10/625* (2014.01)
  *H01M 10/647* (2014.01)
  *H01M 10/651* (2014.01)
  *H01G 9/04* (2006.01)
  *H01G 11/74* (2013.01)
  *H01G 11/82* (2013.01)
  *H01M 10/0525* (2010.01)
  *H01M 10/058* (2010.01)

(56) References Cited

U.S. PATENT DOCUMENTS

2004/0062983 A1* 4/2004 Abe et al. ............... 429/162
2008/0292950 A1   11/2008 Maeda et al.
2008/0318126 A1* 12/2008 Ishii ....................... 429/223
2009/0169990 A1   7/2009 Gardner et al.
2010/0104935 A1* 4/2010 Hermann et al. ........ 429/120
2010/0136428 A1* 6/2010 Yokoyama et al. ...... 429/209

FOREIGN PATENT DOCUMENTS

EP   1 796 186 A1   6/2007
EP   2 006 940 A1   12/2008
WO   2009/073492 A2   6/2009

* cited by examiner

ENERGY STORAGE CELL

BACKGROUND OF THE INVENTION

Field of the Invention

The invention relates to an energy storage cell that can be used in particular in motor vehicles of all types. The energy storage cell is particularly suitable for use in hybrid vehicles or electric vehicles.

Vehicles that are as a matter of principle driven fully or partially by means of electrical energy are designated as electric vehicles and/or hybrid vehicles.

Motor vehicles having a hybrid drive that are also called hybrid vehicles comprise for example a combustion engine, an electric motor and one or a plurality of electro-chemical/electric energy storage devices. Electric vehicles having fuel cells generally comprise at least one fuel cell for energy conversion, a tank for fluid or gaseous energy carriers, an electro-chemical/electrical energy storage device and an electric motor for the drive.

The electric motor of the hybrid vehicle is generally embodied as a starter/generator and/or electric drive. When embodied as a starter/generator, it replaces the normally available starter and the electric generator. In the case of an embodiment as an electric drive, an additional torque, i.e. an acceleration torque, can contribute to the forward thrust of the vehicle by the electric motor. When embodied as a generator, it renders possible the recuperation of braking energy and the vehicle electrical supply.

In the case of a solely electrical vehicle, the drive capacity alone is provided by means of an electric motor. In the case of both vehicle types, hybrid vehicles and electric vehicles, it is a common requirement that large quantities of electric energy are provided and transferred.

The energy flow is controlled by way of electronics, generally referred to as hybrid controllers. Said electronics control inter alia whether and in which quantity energy is to be drawn from or supplied to the energy storage device.

Energy being drawn from the energy storage device is generally used for providing driving power and for supplying the vehicle electrical system. Energy being supplied to said energy storage device is used for charging the storage device and/or for converting braking energy into electrical energy, i.e. regenerative braking.

The energy storage device for hybrid applications can be recharged during the driving operation. The energy required for this purpose is provided by the combustion engine.

Energy storage cells can be, for example, lead batteries, electric double layer capacitors, nickel-zinc cells, nickel-metal hydride cells and/or lithium-ion cells.

The lithium-ion cells are in most cases accommodated in a gas-tight metal housing. A special option for the embodiment in the case of lithium-ion cells resides in the form of a soft pack. Said soft pack comprises a battery cell that is encased by a film, typically an aluminum composite film packaging.

In order to be able to use energy storage cells in motor vehicles, said energy storage cells should fulfill in particular three conditions. On the one hand, the current-carrying capacity of the entire cell, in particular by way of the internal and external conductor electrodes, should be sufficiently high, since peak currents greater than 400 A can occur depending upon the vehicle size and performance requirements. In addition, an efficient cooling of the cell or an efficient discharge of heat from the cell should be ensured and in addition it should be possible to arrange the cells in a compact manner, wherein in particular the usability in existing standard installation spaces in motor vehicles for starter batteries (H7, H8) is of advantage.

BRIEF SUMMARY OF THE INVENTION

It is the object of the present invention to provide an energy storage cell that fulfills the above-mentioned conditions, i.e. on the one hand a high current-carrying capacity is rendered possible and on the other hand it can be effectively cooled and can be arranged in a compact manner.

This object is achieved by means of the energy storage cell as claimed, the energy storage cell as claimed and the battery as claimed. The respective dependent claims disclose advantageous embodiments of the energy storage cells in accordance with the invention.

An energy storage cell in accordance with the invention comprises a cell body that extends in a two-dimensional manner in an extension plane. A planar cell body of this type therefore comprises a front plane and a rear plane, which can both be regarded as the extension plane, in which the cell body extends in a two-dimensional manner. The front plane and the rear plane of the cell body normally comprise identical contours and/or forms and are arranged in parallel one above the other. Side planes are arranged between the front plane and the rear plane along the edges of the front plane and the rear plane. The front plane, the rear plane and the side planes enclose the inner space of the cell body. In an advantageous manner, the said planes seal the inner space of the cell body in a fluid-tight and/or gas-tight manner, wherein if necessary apertures for conductor electrodes can be provided, which apertures are also enclosed accordingly in a fluid-tight and gas-tight manner by the side planes.

Preferably, the front plane and the rear plane, i.e. also the plane in which the cell body extends in a two-dimensional manner, are rectangular, wherein a form of this type is to be regarded as rectangular that comprises two mutually facing perpendicular pairs of parallel opposite edges, wherein, however, the corners of the rectangle can be rounded or chamfered.

The statement that the cell body extends in a two-dimensional manner means in this case that the edge length of the front plane and the rear plane is considerably greater than the distance of the front plane from the rear plane. In the case of a cuboid-shaped cell body, two edges of each side plane extend in each case along edges of the front plane or the rear plane. The edges of the corresponding side planes are then precisely the length of the width of the cell body, said edges being perpendicular to said planes.

For the case that the cell body is rounded or chamfered at its edges that are perpendicular to the front plane and to the rear plane, the side planes in the region of the rounded edges follow the rounded and/or chamfered progression of the edges of the front plane or the rear plane. In as much as reference is made hereinunder to the corresponding edges that are perpendicular to the front plane and rear plane, then with respect to the position of these edges in the case of rounded edges, this is understood to be the center of the rounded and/or chamfered progression.

The energy storage cell in accordance with the invention comprises at least a first and at least a second conductor electrode, wherein normally one of the electrodes is a positive electrode and one of the electrodes is a negative electrode. The conductor electrodes are arranged in accordance with the invention on a side plane of the cell body or on two opposite parallel side planes of the cell body. Preferably, the conductor electrodes have (in a cross-section in parallel with the front plane or the rear plane of the cell body) a rectangular form. They then border with one edge the corresponding side plane of the energy storage cell. In as much as the electrode body extends through the corresponding side wall into the inner space of the cell body, it is intended hereinunder preferably, where reference is made to the geometry of the conductor electrodes, that only the part of the electrodes that is located outside the cell body is referred to.

In an embodiment of the invention, the first and the second conductor electrodes are now arranged on the same side plane of the cell body. In this case, the conductor electrodes are arranged in a symmetrical manner with respect to the center of the corresponding side plane in the direction of the circumference of the cell body that extends in parallel with the edges of the front plane and the rear plane. The center of the side plane is therefore the point which halves the corresponding side plane along its edges that are in parallel with the front plane and rear plane.

It has been recognized in accordance with the invention that the above mentioned objects can be achieved in a particularly advantageous manner by means of a suitable geometric arrangement and embodiment of the conductor electrodes and of the cell body. In accordance with the invention, the conductor electrodes are arranged and embodied in the embodiment with two conductor electrodes arranged on a side plane in such a manner that a contact point of the side edge of the first and of the second conductor electrode that is facing the center includes with the center of the corresponding side plane an angle $\lambda$ about a center point of the plane in which the cell body extends in a two-dimensional manner, i.e. the front plane or the rear plane, of $10°<\lambda<36°$. Preferred is $\lambda \geq 15°$, particularly preferred $\geq 20°$ and/or preferred is $\lambda \leq 30°$, particularly preferred $\leq 25°$.

In as much as it is described here and hereinunder that a first point and a second point include an angle about a third point, then this means that a connecting line between the first point and the third point includes this angle with a connecting line of the second point with the third point.

Simultaneously or in addition, an angle $\beta$ that the contact point of the side edge of the first and the second conductor electrode that is remote from the center of the side plane includes with the center of the side plane about the center point of the extension plane in which the cell body extends is $8°<\beta<45°$. Preferred is $\beta \geq 15°$, particularly preferred $\geq 25°$ and/or preferred is $\beta \leq 40°$, particularly preferred $\leq 30°$.

The said angle regions produce a particularly good current-carrying capacity, wherein a high ability to discharge heat is achieved that contributes to effective cooling. In addition, cells that are embodied in this manner can be easily connected one to the other to form a cell packet (battery) with efficient cooling.

Preferably, a ratio of the double line between the contact point of the edge facing the center with the corresponding end plane and the contact point of the edge remote from the center with the corresponding side plane (i.e. the width of the conductor electrode) with respect to the length of the corresponding side plane lies between 1:2 and 4:5, preferably is 2:3. In as much as the conductor electrodes are rectangular in their plane that is in parallel with the extension plane of the cell body, the width of the conductor electrode that is in parallel with the side plane on which said conductor electrodes are arranged is therefore selected in such a manner that the ratio of the double of the width with respect to the length of the corresponding side plane along the edge of the extension plane lies between 1:2 and 4:5 and preferably is 2:3. It is essentially the numerical value of the ratio that is of importance. This value is selected in such a manner that the good current-carrying capacities and high abilities to discharge heat are achieved.

In a further embodiment of the present invention, the first and the second conductor electrode are arranged on opposite side planes of the cell body. In this case, the conductor electrodes extend in a symmetrical manner with respect to the center of the side plane on which said conductor electrodes are arranged, wherein the center of the side plane is defined as described above. In this case, the conductor electrodes are rectangular in a plane that is in parallel with the extension plane of the cell body, wherein two edges extend in parallel with the corresponding side plane and two edges are perpendicular thereto. The conductor electrodes are now arranged and embodied in such a manner that the contact points of side edges of the conductor electrodes with the corresponding side plane on the one hand, which side edges are perpendicular to the corresponding side plane, and with the center of the corresponding side plane on the other hand include an angle $\lambda$ about the center of the extension plane of the cell body with $\lambda \geq 20°$, preferably $\geq 30°$, particularly preferably $\geq 40°$ and/or $\leq 60°$, preferably $\leq 50°$.

Alternatively or in addition, the edges of the conductor electrodes that are remote from the corresponding side plane, i.e. that are not arranged on the corresponding side plane and that in addition are not in parallel with the circumference of the extension plane (i.e. in the normal case perpendicular to the extension plane), include with the center of the corresponding side plane an angle $\gamma$ about the center point of the extension plane of $\lambda \geq 25°$, preferably $\geq 35°$ and/or $\leq 55°$, preferably $\leq 45°$. This means therefore, that a line that is in parallel with the extension plane includes the corresponding angle $\lambda$ between the center point of the extension plane and the corresponding edge with a line between the center point of the extension plane and the center of the corresponding side planes.

In this embodiment, an angle $\beta$ between the corners of the extension plane that define the side planes that comprise the conductor electrodes and the center of the corresponding side plane is selected to be preferably $40°<\beta<60°$. Preferred is $\beta \geq 45°$ and/or $\leq 55°$.

Preferably, in this embodiment, a ratio of the width of the conductor electrodes, i.e. of their extension, in the direction in parallel with the length of the the to the side plane on which said conductor electrodes are arranged, with respect to the length of the corresponding side plane in a parallel direction, i.e. in the direction in parallel with the circumference of the extension plane of the energy storage cell, lies between 2:10 and 9:10 and preferably is 2:3.

An energy storage cell can comprise in the inner space of the cell body a plurality of internal conductors with which current can be drawn off from the energy storage cell. In this case, all the conductors of a particular polarity can be connected to the corresponding external conductor electrode of the identical polarity. It is preferred in this case if a cross-sectional area of the conductor electrodes perpendicular to the flow direction of a current that is drawn off from the energy storage cell by means of the corresponding conductor electrode, and/or the size of this conductor electrode, is greater than or equal to the summation of the cross-sectional areas and/or of the sizes of the internal conductors connected to this conductor electrode. In this manner, it can be ensured that the electrode (external conductor) can conduct the identical amounts of current as the internal conductors together.

One of the conductor electrodes can be a positive conductor electrode that comprises or consists of aluminum. The other conductor electrode can be a negative conductor electrode that comprises or consists of copper, preferably nickel-plated copper. The specific conductivities of aluminum and copper are in the ratio of approx. 1:1.6. It is therefore preferred if the conducting capacities of the conductor electrodes in order to achieve an optimum amount of heat discharged and an optimum amount of current drawn-off are embodied in such a manner that the aluminum conductor electrode comprises a greater conductor size and/or conductor width than the copper conductor electrode. In this case, the cross-sectional area of the aluminum conductor electrode in the direction perpendicular to the current flow direction can therefore be greater than the corresponding cross-sectional area of the copper conductor electrode. It is particularly preferred if the corresponding cross-sectional areas of the aluminum conductor electrode with respect to the copper conductor electrode are in the ratio 1.6:1.

If the energy storage cell as described above comprises a plurality of internal conductors, wherein the internal conductors of a particular polarity are connected to the conductor electrode of the corresponding polarity, then it is preferred if the summation of the weights, i.e. of the masses, of the internal conductors with respect to the weight, i.e. with respect to the mass, of the corresponding external conductor is in the ratio 5:1 to 15:1, preferably in the ratio 10:1. The disclosed ratio is therefore between the mass of aluminum and/or copper inside the cell and the mass of aluminum and/or copper outside the cell.

The conductor electrodes in accordance with the embodiments of the present invention can be advantageously cuboid-shaped. In other words, they comprise 12 edges that are perpendicular to each other. However, it is particularly preferred if the edges of the conductor electrodes that are perpendicular to the side plane on which the conductor electrode is arranged are chamfered. As a consequence, a cross-section of the conductor electrodes is produced in parallel with the corresponding side plane that is hexagonal or octagonal. This chamfered arrangement is produced in order to prevent the metallic conductor edges from pushing through the seal layer and consequently to prevent a short circuit across the conductors.

It is preferred if the cell body is almost square in the plane in which it extends in a two-dimensional manner. In this case, a ratio of a length of the cell body with respect to a width of the cell body in this plane is in the range between 0.85:1 and 1.15:1. In this case, the cell length is measured at the edge of the extension plane on which the conductor electrodes are arranged and the cell width is measured on the edges that are perpendicular thereto. Alternatively or simultaneously, the extension plane of the cell can be selected in such a manner that a ratio of an angle $\epsilon$ about the center point of the extension plane between the edges that define the long side to an angle $\delta$ about the center point between the edges that define the wide side lies between 80°:100° and 100°:80°. Square cells can also be included.

In the embodiments of the invention, it is preferred if the energy storage cells are embodied in such a manner that they can be arranged in a housing whose side plane that in the case of an arrangement of the energy storage cells in the housing lies in parallel with the extension plane comprises an edge length between 100 mm and 175 mm and for the other edge length 100 mm to 190 mm. In this manner, the existing installation space dimensions for the installation of a starter battery can be fully exploited. The dimensions of the cell in the plane in which the cell body extends are therefore for the shorter side≥100 mm, particularly preferably ≥150, particularly preferably ≥175 mm and for the longer side≥100 mm, particularly preferably ≥140 mm, particularly preferably ≥170 mm, particularly preferably ≥190 mm.

A plurality of energy storage cells in accordance with the invention can be stacked and mutually connected to form an energy storage device. They can be arranged for this purpose in a housing like the one described above. In this case, they preferably lie one above the other with parallel extension planes.

The invention is explained hereinunder by way of example with reference to some figures, in which:

DESCRIPTION OF THE INVENTION

Figure 1:
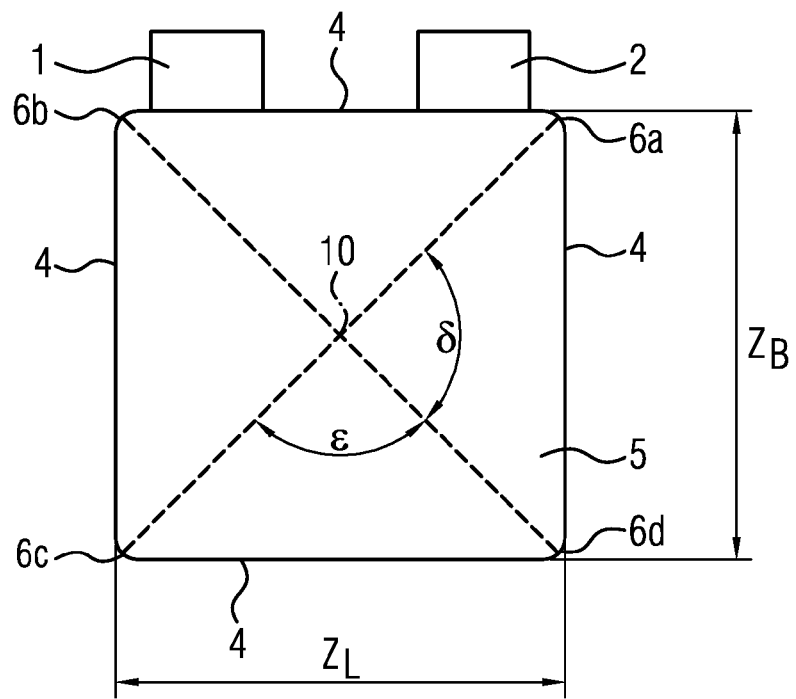
FIG. 1 shows an example of an energy storage cell having two conductor electrodes that are arranged on a side plane.

FIG. 1 illustrates an energy storage cell in accordance with the invention having a first conductor electrode 1 and a second conductor electrode 2 that are arranged on a side 4 of a cell body 5. The figure illustrates in this case a view of an extension plane of the cell body 5 that is defined by the side planes 4 that are perpendicular to the plane of the figure. The energy storage cell extends in the plane of the drawing in a two-dimensional manner and is clearly further extended in the plane of the drawing than perpendicular thereto. The cell body is therefore substantially plate-shaped.

In this case, the extension plane is almost a square, wherein a ratio of the angle $\epsilon$ between the edges that define the side planes that comprise the conductor electrodes 1, 2 and of an angle $\delta$ between the edges of the side planes that are perpendicular thereto lies between 80°:100° and 100°:80°, preferably between 90°:100° and 100°:90°. The ratio of the length of the side plane $Z_L$ that comprises the conductor electrodes 1, 2 to the length $Z_B$ of the side planes that are perpendicular thereto is, for example, between 0.85:1 and 1.15:1.

Figure 2:
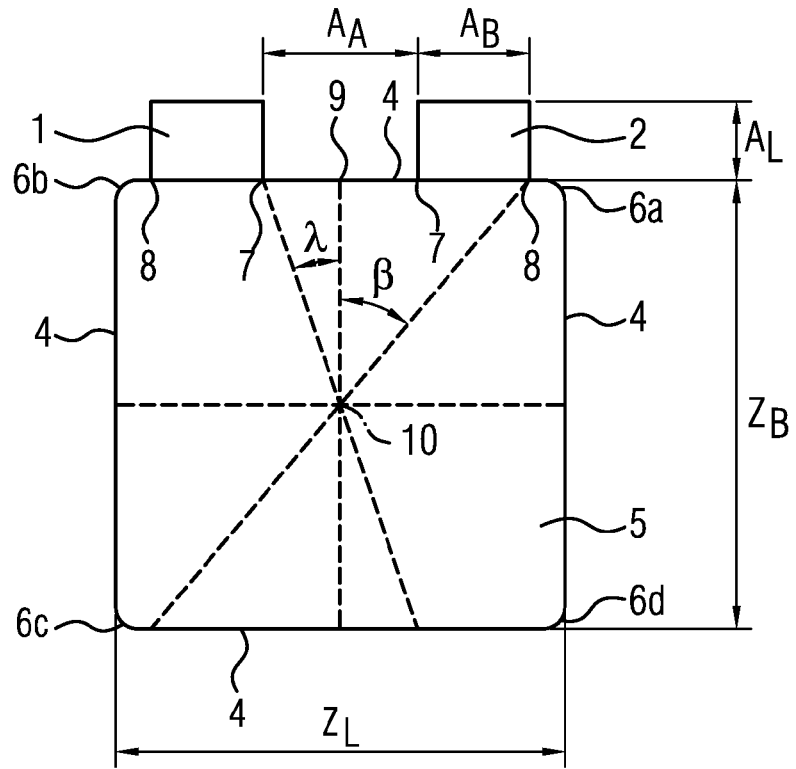
FIG. 2 shows the precise positioning of the conductor electrodes in the example illustrated in FIG. 1.

FIG. 2 illustrates an energy storage cell that corresponds to the energy storage cell illustrated in FIG. 1. Like reference numerals correspond in this case to like or corresponding features.

The electrodes 1 and 2 are in this case embodied in a rectangular manner. The electrodes 1, 2 are dimensioned and arranged in such a manner that a contact point 7 of an edge of the electrode 1, 2 that faces the center point 9 of the side plane 4 on which the conductor electrodes 1 and 2 are arranged includes an angle $\lambda$ with the center point 9 about a center point 10 of the extension plane, which angle lies between 10° and 36°. In addition, an angle $\beta$ between a contact point 8 of an edge of the conductor electrodes 1 and 2 with the side plane, which edge is remote from the center point 9 of the side plane 4, and the center point 9 of the side plane about the center point 10 of the extension plane lies between 8° and 45°.

In the examples illustrated in FIGS. 1 and 2, the corners 6a, 6b, 6c, 6d of the extension plane are rounded. In the rounded regions, the side planes 4 follow the progression of the edges of the extension plane.

Figure 3:
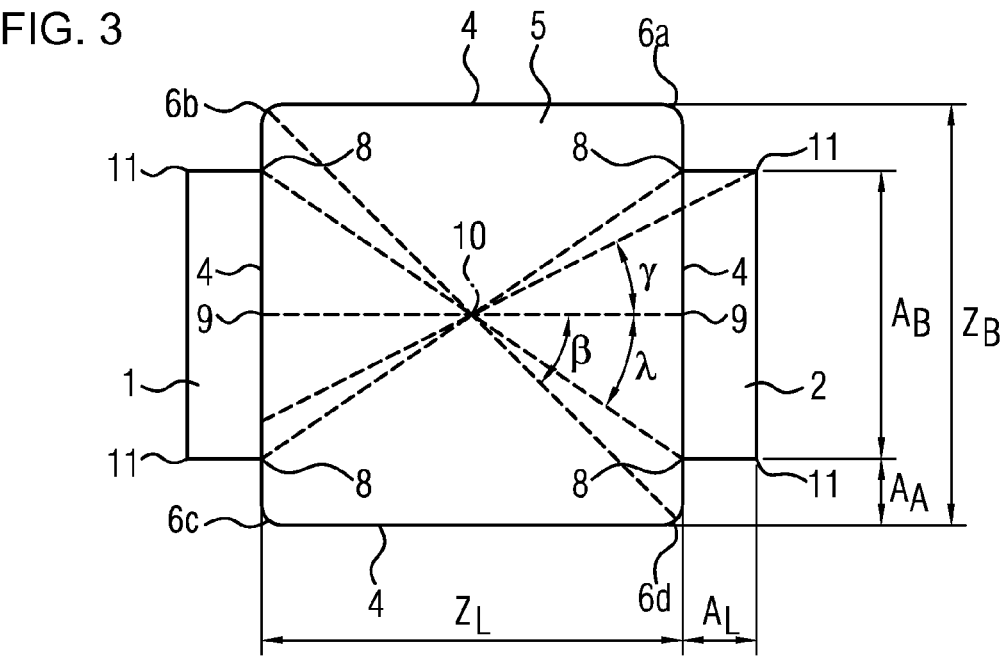
FIG. 3 shows an embodiment of the invention having two conductor electrodes that are arranged on opposite side planes.

FIG. 3 illustrates an embodiment of the energy storage cell in accordance with the invention in which the conductor electrodes 1 and 2 are arranged on opposite side planes 4 of the cell body 5. The conductor electrodes 1 and 2 are in turn embodied in a rectangular manner and are arranged in a symmetrical manner about a center 9 of the side plane 4 on which said conductor electrodes are arranged, so that a center of the conductor electrode in the direction of its width coincides with the center 9 of the side plane. The conductor electrodes 1 and 2 are in addition dimensioned and arranged in such a manner that an angle λ about the center point 10 of the extension plane between a contact point of the edges that are perpendicular to the corresponding side plane with the corresponding side plane and the center point 9 of the corresponding side plane lies between 20° and 60°. In addition, the edges 11 of the conductor electrodes, which edges are remote from the side plane 4, include with the center point 9 of the corresponding side planes an angle γ about the center point 10 of the extension plane that lies between 25° and 55°. In addition, the side planes 4 of the cell body 5, which side planes comprise the conductor electrodes 1 and 2, are dimensioned in such a manner that an angle β about the center point 10 of the extension plane between the edge that defines the side plane in the direction of the circumference of the extension plane and the center point 9 of the corresponding side plane 4 lies between 40° and 60°.

The lengths of the side planes 4 in the examples illustrated in FIGS. 1, 2 and 3 can preferably be selected in such a manner that the cells can be used in existing battery housings. In this case, a short side plane 4 can be, for example, between 120 and 170 mm long and a long side plane can be between 100 and 200 mm. A thickness of the cell body in the direction perpendicular to the plane of the drawing can be, for example, between 3 and 8 mm, particularly preferably between 5 and 7 mm.

In the case, as illustrated in FIGS. 1 and 2, that the conductor electrodes are arranged on a common side plane, the width of the conductor electrodes 1 and 2 can be selected in such a manner that the double width of one of the conductor electrodes is ½ to ⅘, preferably ⅔, of the length of the corresponding side plane. For the case that, as illustrated in FIG. 3, the conductor electrodes are arranged on opposite side planes, the width of the conductor electrodes can be selected in such a manner that they are 2/10 to 9/10, preferably ⅔, of the length of the corresponding side planes.

Figure 4:
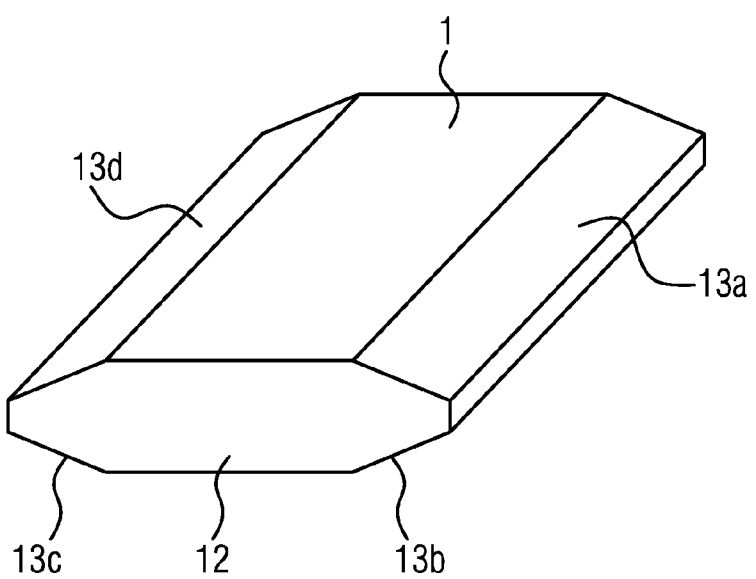
FIG. 4 shows a chamfered conductor electrode.

FIG. 4 illustrates an individual conductor electrode 1 that can be arranged with a plane 12 on a side plane 4 of a cell body 5. The edges 13a, 13b, 13c, 13d that are perpendicular to the side plane 4 are in this case chamfered.

The conductor electrodes can, for example, comprise or consist of copper and/or can comprise or consist of aluminum.

The energy storage cells can comprise a plurality of internal conductors with which currents can be drawn off from the energy storage cell. Conductors of one polarity can then be electrically connected to the corresponding conductor electrode of the identical polarity. In this case, the cross-sectional area of the conductor electrode in the direction perpendicular to the current flow through the conductor electrode preferably corresponds to the summation of the cross-sectional areas of the internal conductors in the direction perpendicular to the current flow direction through the corresponding internal conductors. If, for example, 30 internal conductors of negative polarity are provided in an internal copper-conductor film having a thickness of 10 μm, then a thickness of 300 μm is produced for the negative conductor electrode. Preferably, the conductor electrode is embodied from nickel-plated copper. In the case of 30 positive internal conductors having a thickness of an internal aluminum conductor film of approx. 15 to 18 μm, a thickness of 450 μm to 540 μm is produced for the positive conductor electrode. The positive conductor electrode is preferably embodied from surface-treated aluminum that renders possible an improved adhesion to the battery housing and improved leak tightness with respect to the battery housing.

The disclosed values can, for example, fluctuate up and down by 50%. In this case, the type of cooling of the cell can be in particular a contributory factor. The described embodiment renders it possible to ensure an optimum discharge of the energy converted in the cell together with a correspondingly efficient discharge of heat, which renders possible an optimum cooling of the entire system. In addition, an efficient discharge of heat and efficient cooling also prevents the formation of localized hot spots and according to the Arrhenius equation extends the serviceable life of the entire system.

The invention claimed is:

1. An energy storage cell, comprising:
a cell body extending two-dimensionally in an extension plane and having four lateral planes arranged along a circumference of the extension plane, with two of said lateral planes extending in each case parallel to one another and with the extension plane having a center point;
first and second rectangular conductor electrodes respectively disposed on two mutually opposite lateral planes, said conductor electrodes being disposed in each case symmetrically in the direction of the circumference about a center of the corresponding said lateral plane, and each said conductor electrode forming a contact point where an edge thereof contacts the respective said lateral plane, and said conductor electrodes having edges remote from the corresponding said lateral plane and extending non-parallel with the circumference of the extension plane;
wherein said edges remote from the corresponding said lateral plane are defined as remote edges;
wherein at least one of said conductor electrodes is constructed such that an angle γ formed between a line extending from the center point of the extension plane to one of said remote edges of said one of said conductor electrodes and a line extending from the center point of the extension plane to the center of the respective said lateral plane has a value of $25°<\gamma<55°$; and
wherein an angle β between a connecting line of edges formed between said lateral planes, which edges define said lateral planes that comprise said conductor electrodes in the direction of the circumference, and the center point of the extension plane on the one hand and a connecting line between the center of the respective said lateral plane and the center point of the extension plane on the other hand has a value of $40°<\beta<60°$.

2. The energy storage cell according to claim 1, wherein a ratio of an extension of said conductor electrodes in the circumferential direction of the extension plane in a region of the corresponding said lateral plane with respect to a length of the corresponding said lateral plane in the circumferential direction lies between 2:10 and 9:10.

3. The energy storage cell according to claim 2, wherein the ratio of the extension of said conductor electrodes to the length of the corresponding said lateral plane amounts to 2:3.

4. The energy storage cell according to claim 1, wherein a cross-sectional area of said conductor electrodes perpendicular to a flow direction of a current that is drawn off by way of the corresponding conductor electrode from the energy storage cell is in each case greater than or equal to a sum of the cross-sectional areas of a plurality of internal conductors in the energy storage cell, to which internal conductors the corresponding conductor electrode is electrically connected.

5. The energy storage cell according to claim 1, wherein said first conductor electrode is a positive conductor electrode comprising or consisting of aluminum and said second conductor electrode is a negative conductor electrode comprising or consisting of copper, wherein a ratio of a cross-sectional area of said first positive conductor electrode perpendicular to a flow direction of a current that is drawn off by way of said conductor electrode from the energy storage cell with respect to a corresponding cross-sectional area of said second negative conductor electrode is greater than 1.

6. The energy storage cell according to claim 5, wherein the ratio of a cross-sectional area of said first positive conductor electrode to the cross-sectional area of said second negative conductor electrode is greater 1.6:1.

7. The energy storage cell according to claim 1, wherein a ratio of a mass of at least one of said conductor electrodes with respect to a total mass of all internal conductors of the energy storage cell, which internal conductors are connected to the corresponding said conductor electrode, lies between 1:5 and 1:15.

8. The energy storage cell according to claim 7, wherein the ratio of the mass of at least one of said conductor electrodes to the total mass of all internal conductors connected thereto is 1:10.

9. The energy storage cell according to claim 1, wherein edges of said conductor electrodes extending perpendicular to the corresponding said lateral plane are chamfered.

10. The energy storage cell according to claim 1, wherein:
a ratio of the lengths of one pair of said mutually parallel lateral planes in the circumferential direction of the extension plane with respect to the lengths of the other pair of said mutually parallel lateral planes in the circumferential direction of the extension plane lies between 0.85:1 and 1.15:1; and/or a ratio of an angle $\epsilon$, the angle $\epsilon$ connecting the edges defining one pair of mutually parallel lateral planes in the circumferential direction and the center point of the extension plane, with respect to an angle $\delta$, the angle $\delta$ connecting the edges defining the other pair of mutually parallel lateral planes in the circumferential direction and the center point of the extension plane, lies between 80°:100° and 100°:80°; and said conductor electrodes are disposed on one or two said lateral planes of one pair of said mutually parallel lateral planes.

11. The energy storage cell according to claim 1, wherein at least one of the following is true:
said lateral planes of one and/or the other pair of parallel lateral planes have a length in the circumferential direction of the extension plane ≥100 mm;
the length of said lateral planes lies between ≥120 mm and <200 mm;
the length of said lateral planes is <190 mm;
the length of said lateral planes is ≤175 mm;
the length of said lateral planes is ≤170 mm;
a thickness of said cell body perpendicular to said extension plane is ≥3 mm;
the thickness of said cell body perpendicular to said extension plane is ≥5 mm and ≤8 mm;
the thickness of said cell body lies between ≥5 mm and ≤7 mm.

12. A battery, comprising: one or more energy storage cells according to claim 1.

13. The energy storage cell according to claim 1, wherein said contact points of one or both said conductor electrodes include with the center of the corresponding said lateral plane an angle $\lambda$ about a center point of the extension plane of 20°<$\lambda$<60°.

* * * * *